Oct. 21, 1969             P. SCHWAKE             3,473,396
DOUBLY UNBALANCED DRIVE FOR VIBRATORY CONVEYORS, SIFTING
MACHINES AND THE LIKE
Filed Dec. 12, 1966
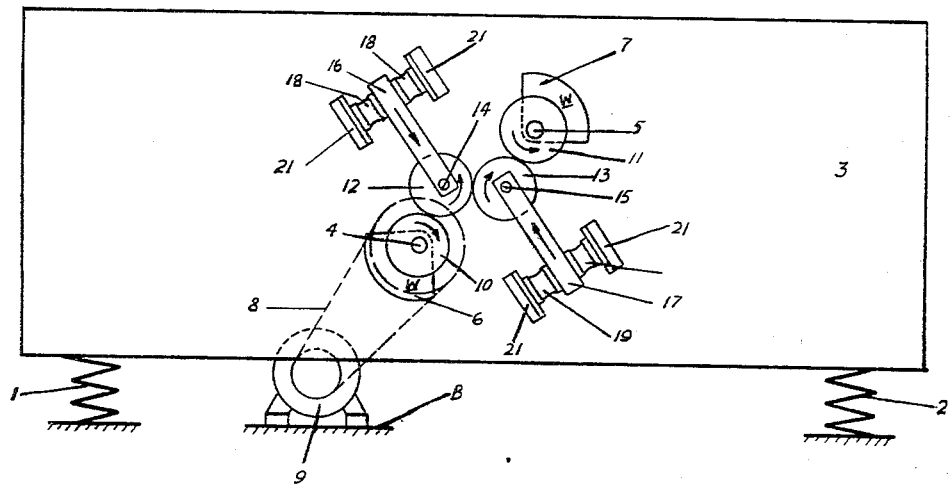
INVENTOR.
PAUL SCHWAKE
BY Burgess, Dinklage & Sprung
ATTORNEYS

United States Patent Office 3,473,396
Patented Oct. 21, 1969

3,473,396
DOUBLY UNBALANCED DRIVE FOR VIBRATORY
CONVEYORS, SIFTING MACHINES AND THE
LIKE
Paul Schwake, Oelde, Westphalia, Germany, assignor to
Haver & Boecker, Oelde, Westphalia, Germany, a corporation of Germany
Filed Dec. 12, 1966, Ser. No. 601,198
Int. Cl. B07b 1/42; F16h 33/02
U.S. Cl. 74—61                                    6 Claims

ABSTRACT OF THE DISCLOSURE

A doubly unbalanced drive having two synchronously equal magnitude counter-rotating shafts rotatably mounted on a vibrating conveyor or sifting machine to which unbalancing weights are adjustably attached to provide for predetermined directional vibratory movement of a resiliently supported body.

---

The invention relates to a doubly unbalanced drive for the production of directed vibrations such as are used in vibratory conveyors and vibratory sifting machines. By a doubly unbalanced drive is meant one having two synchronously counter-rotating shafts, both of which are provided with an imbalance of equal magnitude. Shaker motors and other vibration apparatus in which each unbalanced shaft is driven by a separate motor are generally known in the prior art.

It is furthermore known in the prior art to drive one unbalanced shaft through a direct coupling to a motor, while the driving of the second unbalanced shaft is performed by the same motor through a pair of gears having the same number of teeth. On account of the severe shocks occurring in vibrating bodies when the machine is started up and when it runs down, such gears are subjected to great stresses and do not have satisfactorily long lives. On the other hand, such gear problem can be eliminated by driving the shafts with individually separate motors, a solution however which is relatively expensive.

A machine has also become known in which adjacent imbalances are driven by a single motor. In such machine, a drive belt is slung around the drive shaft or belt pulley of the unbalanced shafts in such a manner that both imbalances are driven simultaneously and counter-rotate in synchronism. This particular machine is useful in that it is capable of performing directed vibrations. However, the difference in the looping angles between the drive belt and drive shaft results in a differential belt slip which is disadvantageous because the imbalances can become offset from one another and thereby produce a change in the direction of excitation and hence in the angle of throw of any vibratory conveyor or sifting machine which they drive.

It is a purpose of the invention to avoid the aforementioned disadvantages and to create a simple and sturdy doubly unbalanced drive which is driven by only a single motor and which is relatively insensitive to vibration and shock.

The invention essentially resides in the transmission of rotary power from the one unbalanced shaft that is driven by a motor to the other unbalanced shaft by means of two friction wheels which are fastened to the vibrating body, such as a vibratory conveyor or sifting machine, by elastic mounts.

The doubly unbalanced drive arrangement according to the invention can be used in general for exciting vibratory movement of any resiliently supported body, and features a pair of shafts mounted to the body for support thereby and for rotation relative thereto. An unbalancing weight affixed to each of these shafts for rotation therewith serves to induce vibratory movement of the body. One of the shafts is coupled to an external motor means to be rotatably driven thereby, and such coupling means can be, in general any conventional type, such as for example a belt and pulley system. A rotary power transmission means coupled to the driven shaft and also coupled to the other shaft, i.e. the indirectly driven shaft, serves to counter-rotate both shafts in synchronism. This transmission means includes at least one rotatable element resiliently supported by the body so as to minimize any differential in the rotation speeds of the two shafts.

Preferably, a pair of resiliently supported rotatable elements are provided, these rotatable elements being disposed for mutual rolling contact engagement to transmit rotary power by friction. Each rotatable element is resiliently supported by the body for frictional contact which varies in accordance with the difference in rotational speeds of the two shafts.

According to a preferred embodiment of the invention, a transmission means including two pairs of rotatable wheel members is used. The wheel members of one pair are each mounted on a corresponding shaft for rotation therewith. Both wheel members of the second pair are resiliently supported by the body and are positioned for mutual rolling contact engagement. In addition to their mutual rolling contact engagement, one second pair wheel member is also arranged for rolling contact engagement with the wheel member of the first pair which is mounted on the driven shaft, and the other second pair wheel member is also arranged for rolling contact engagement with the other first pair wheel member, which is mounted on the other or indirectly driven shaft. The wheel members of the second pair are resiliently supported for limited movement relative to each other and relative to the wheel members of the first pair so that they assume positions wherein the rolling contact friction between each combination of two contacting wheels varies in accordance with the rotational speed differential of the counter-rotating shafts. Thus, the rolling contact friction between the aforesaid contacting wheels increases in magnitude from a predetermined value as the rotational speed differential of the two shafts increases, and the frictional force returns to such predetermined value whenever the shafts are at the same rotational speed or at rest.

The resiliently supported wheels thus act as intermediate rotary power transmission elements for transferring the rotation of the wheel on the directly driven shaft to the wheel on the indirectly driven shaft, and these intermediate wheels can be resiliently supported in a variety of ways. According to a preferred embodiment of the invention, the intermediate wheels are carried by independent support members resiliently connected to the body to be vibrated. The resilient connection of such support members to the body can be accomplished by a variety of means, but preferably each support member is connected at one end to the body by one or more resilient rubber members.

It is therefore an object of the invention to provide a doubly unbalanced drive arrangement for exciting vibratory movement of a resiliently supported body.

Another object of the invention is to provide a drive arrangement as aforesaid which requires only a single motor.

A further object of the invention is to provide a drive arrangement as aforesaid wherein the use of gears or other elements sensitive to vibration and shock is avoided.

A further object of the invention is to provide a drive arrangement as aforesaid wherein one imbalanced shaft is coupled to the motor means and the other imbalanced shaft is coupled to be indirectly driven by the motor coupled shaft through a transmission having only rolling contact type rotary power transmission elements.

Still another and further object of the invention is to provide a drive arrangement as aforesaid wherein the magnitude of the rolling contact friction which serves for transmitting rotary power from the one shaft to the other is automatically adjusted in accordance with the magnitude of their speed differential to reduce such differential to zero and thereby counter-rotate such shafts in synchronism.

Other and further objects and advantages of the invention will become apparent from the following detailed description and the accompanying drawing which illustrates schematically a doubly imbalanced drive arrangement according to a preferred embodiment of the invention for exciting vibratory movement of a resiliently supported body.

Referring now to the drawing, the vibrating body 3 is resiliently supported on springs 1 and 2 and bears rotatable shafts 4 and 5 mounted upon it. Each shaft 4 and 5 has an affixed unbalancing weight W. Both weights W are so constructed and arranged geometrically as to provide dynamic unbalance forces of equal magnitude as their respective shafts 4, 5 rotate. The angular phase relationship between the dynamic forces of the weights W can be adjusted for exciting vibration of the body 3 along a particular direction in the conventional manner simply by positioning the weights W to align their centres of gravity with corresponding radial lines extending from the axes of shafts 4 and 5. The weights W expediently have centres of gravity located at the same radial distance from their respective shaft axes and are of equal mass so that when both shafts 4 and 5 counter-rotate at the same speed, they will transmit equal magnitude dynamic forces to the body 3.

Shaft 4 is rotatable driven by a motor 9, and for such purpose is coupled thereto by means of a V-belt and pulley system 8. The motor 9 is supported upon a base surface B as are the springs 1, 2 and motor 9 undergoes no significant vibration.

Between wheels 10 and 11 fastened onto the shafts 4 and 5 respectively for rotation therewith, are mounted two friction wheels 12 and 13 with their respective shafts 14 and 15 mounted in individual support holders 16 and 17. The shaft holders 16 and 17 are connected to the vibrating body 3 through pairs of resilient rubber connecting members 18 and 19 such that said holders 16 and 17 can perform a limited movement relative to the vibrating body 3.

In the state of rest, the rubber connecting members 18 and 19 are so adjusted that the friction wheels 12 and 13 barely contact one another and the wheels 10 and 11. When the motor 9 is first turned on, so that wheel 10 turns in the direction of the arrow shown on it, friction wheel 12 will be pulled along with the elastically mounted shaft holder 16 in the direction indicated by the arrow on it as a result of the friction produced between wheel 10 and the friction wheel 12. The same pulling action is experienced by the friction wheel 13 carried by shaft holder 17. When the difference in rotary speed between the two wheels is great, a great contact pressure is automatically produced, which tends to reduce the difference in speed. In the event of a small difference in speed, a low contact pressure will be present accordingly. If there is no difference in rotary speed, the contact pressure that has been established at the state of rest will be assumed. Since this contact pressure level is sufficient, in the case of the unbalance weights W, which in this case can be considered as mounted on a relatively stiff vibrating body, the shaft carrying only one of the unbalanced weights W need only be driven, after both shafts have been brought up to speed and synchronized, because the other shaft will remain in synchronism on account of the vibratory coupling. The friction wheel driving arrangement of the invention therefore has the advantage that it experiences severe loading only during the starting up period, and affords another advantage by reason of the fact that the severe shocks produced as when passing through a resonant rotatory speed, which cannot be avoided during the speeding up and running down periods, do not damage the drive.

If the wheels 10 and 11 have the same diameter, the friction wheels 12 and 13 must operate almost without slip, and consequently must be made relatively large in diameter if shaft 5 is to rotate synchronously and contrarily to the driven shaft 4. It has been found that the friction wheels 12 and 13 can be made somewhat smaller in diameter if the diameter of wheel 11 on the indirectly driven shaft 5 is made somewhat smaller than the diameter of wheel 10 on the directly driven shaft 4. For any given case, the difference in diameter between wheels 10 and 11 is chosen to provide a diameter ratio which compensates for the slippage of the friction wheels 12 and 13, which slippage in general will depend upon the contact surface material of the wheels 12 and 13 and their diameter and width dimensions.

The arm-like shaft holders 16 and 17 are preferably of rigid construction and can be made of metal or some other rigid material, as can be the body mounting members 21 to which the rubber members 18, 19 are connected at one end. The resilient connection of the holders 16 and 17 to the body 3 can be accomplished by any suitable rubber-to-metal connectors available on the market, in which case, the rubber members 18, 19 would be included in the connector assembly along with such other fittings as accommodate the fastening to holders 16, 17 and mounting members 21 affixed to the body 3.

From the foregoing description of the invention, it will become apparent to the artisan that the doubly unbalanced drive arrangement according to the invention is susceptible of numerous obvious modifications and variations to suit the needs of a particular application.

What is claimed is:

1. A doubly unbalanced drive arrangement for exciting vibratory movement of a resiliently supported body, which comprises a pair of shafts mounted to said body for support thereby and for rotation relative thereto, an unbalancing weight affixed to each of said shafts for rotation therewith to induce vibratory movement of said body, means coupling one of said shafts to an external motor means to be rotatably driven thereby, and rotary power transmission means coupled to said driven shaft and to the other shaft to counter-rotate same in synchronism with the driven shaft, said transmission means including at least one rotatable element resiliently supported by said body to transmit rotary power by frictional contact to minimize any differential in the rotation speeds of said shafts.

2. The drive arrangement according to claim 1 wherein said transmission means includes a pair of rotatable elements disposed for mutual rolling contact to transmit rotary power by friction, each rotatable element being resiliently supported by said body for frictional contact which varies in accordance with the difference in rotational speeds of said shafts to minimize any such speed differential and thereby synchronize the counter-rotation of said shafts.

3. The drive arrangement according to claim 1 wherein said transmission means includes a first pair of rotatable wheel members each mounted on one of said shafts for rotation therewith, and a second pair of rotatable wheel members resiliently supported by said body, said second pair of wheel members being disposed for mutual rolling contact engagement, one of said second pair of wheel members being also disposed for rolling contact engagement with the wheel member of said first pair mounted on the driven shaft, and the other of said second pair of wheel members being also disposed for rolling engagement with the other wheel member of said first pair mounted on the other shaft, said second pair of wheel members being resiliently supported for limited movement relative to each other and relative to the wheel members of the first pair into positions wherein the rolling contact friction between each combination of contacting wheels varies in accordance with the rotational speed differential of said counter-rotating shafts to minimize such differential and thereby counter-rotate said shafts at synchronous speeds.

4. The drive arrangement according to claim 3 including a first support member resiliently connected to said body and rotatably connected to one wheel member of said second pair to resiliently support same for rotation relative to said body, and a second support member resiliently connected to said body and rotatably connected to the other wheel member of said second pair to resiliently support same for rotation relative to said body.

5. The drive arrangement according to claim 4 wherein the wheel member of said first pair mounted on the driven shaft has a diameter greater than that of the other wheel member of said first pair mounted on the other shaft.

6. The drive arrangement according to claim 4 including at least one rubber member resiliently connecting each support member to said body.

References Cited
FOREIGN PATENTS 900,704   7/1962   Great Britain.

MILTON KAUFMAN, Primary Examiner

U.S. Cl. X.R.

209—367